United States Patent
Kang

(10) Patent No.: US 10,125,833 B2
(45) Date of Patent: Nov. 13, 2018

(54) HIGHLY HEAT-RESISTANT BRAKE DISC FOR RAILCAR

(71) Applicant: KOREA RAILROAD RESEARCH INSTITUTE, Uiwang-si (KR)

(72) Inventor: Dong Hoon Kang, Seoul (KR)

(73) Assignee: KOREA RAILROAD RESEARCH INSTITUTE, Uiwang-si, Gyeonggi-Do (KR)

( * ) Notice: Subject to any disclaimer, the term of this patent is extended or adjusted under 35 U.S.C. 154(b) by 29 days.

(21) Appl. No.: 14/647,406

(22) PCT Filed: Aug. 6, 2013

(86) PCT No.: PCT/KR2013/007061
§ 371 (c)(1),
(2) Date: May 26, 2015

(87) PCT Pub. No.: WO2014/081103
PCT Pub. Date: May 30, 2014

(65) Prior Publication Data
US 2015/0330464 A1     Nov. 19, 2015

(30) Foreign Application Priority Data

Nov. 23, 2012    (KR) .......................... 10-2012-0134012

(51) Int. Cl.
*F16D 65/12*      (2006.01)
*B61H 5/00*      (2006.01)
*F16D 65/02*      (2006.01)

(52) U.S. Cl.
CPC ............. *F16D 65/128* (2013.01); *B61H 5/00* (2013.01); *F16D 65/127* (2013.01);
(Continued)

(58) Field of Classification Search
CPC ...... F16D 65/12; F16D 65/121; F16D 65/124; F16D 65/125; F16D 65/127;
(Continued)

(56) References Cited

U.S. PATENT DOCUMENTS 2,629,464 A * 2/1953 Helsten ................. F16D 65/128
                                                          188/218 XL
2,728,422 A * 12/1955 Kelley .................. F16D 65/128
                                                          188/218 XL (Continued)

FOREIGN PATENT DOCUMENTS

| JP | 2004132398 A | 4/2004 |
| JP | 2004308776 A | 11/2004 |

(Continued)

OTHER PUBLICATIONS

International Search Report dated Sep. 25, 2013 for corresponding International Application No. PCT/FR2013/007061, filed Aug. 6, 2013.

(Continued)

*Primary Examiner* — Thomas J Williams
*Assistant Examiner* — James K Hsiao
(74) *Attorney, Agent, or Firm* — David D. Brush; Westman, Champlin & Koehler, P.A.

(57) ABSTRACT

Provided is a high heat resistant brake disk for a railroad vehicle, which is manufactured using a nano material having high heat conductivity, such as a carbon nanotube (CNT) or graphene, to improve heat resistance of an overheated portion of the brake disk, and which can extend a life of the brake disk by suppressing performance deterioration due to a thermal shock. The high heat resistant brake disk includes a hub inserted into an axle of the railroad vehicle and an outer circumference coupled to a vehicle wheel to coaxially rotate with the vehicle wheel, wherein at least one pattern (Continued)

unit made from a high heat resistant nano material is formed on one surface of the brake disk.

14 Claims, 3 Drawing Sheets

(52) U.S. Cl.
 CPC ...... *F16D 65/124* (2013.01); *F16D 2065/132* (2013.01); *F16D 2200/0039* (2013.01); *F16D 2200/0052* (2013.01)

(58) Field of Classification Search
 CPC ........... F16D 65/128; F16D 2065/1312; F16D 2065/132; F16D 2200/0039; F16D 2200/0052; B61H 5/00
 USPC .................................................. 188/218 XL
 See application file for complete search history.

(56) References Cited

U.S. PATENT DOCUMENTS

| | | | | |
|---|---|---|---|---|
| 3,314,509 A * | 4/1967 | Pelikan | ................. | F16D 65/124 188/218 XL |
| 3,391,763 A * | 7/1968 | Severson | .............. | F16D 65/125 188/218 XL |
| 3,498,417 A * | 3/1970 | Schmid | ................... | B60T 1/062 188/196 P |
| 3,899,054 A * | 8/1975 | Huntress | ................ | F16D 65/128 188/218 XL |
| 4,379,501 A * | 4/1983 | Hagiwara | ............. | F16D 65/128 188/218 A |
| 6,935,470 B1 * | 8/2005 | Smith, Jr. | ................ | F16D 65/12 188/218 XL |
| 8,511,443 B2 * | 8/2013 | Veneziano | .............. | F16D 65/12 188/218 XL |
| 2006/0061011 A1 * | 3/2006 | Kikuchi | .................... | B60C 9/00 264/289.3 |
| 2006/0191768 A1 * | 8/2006 | Epple | ...................... | F16D 13/64 192/113.34 |
| 2009/0050423 A1 * | 2/2009 | Meckel | ................. | C23C 14/028 188/218 XL |
| 2011/0048871 A1 * | 3/2011 | Meckel | ................... | F16D 65/12 188/71.6 |
| 2012/0138398 A1 * | 6/2012 | Nadal Aloy | ............ | F16D 65/12 188/218 XL |
| 2015/0247541 A1 * | 9/2015 | Nogami | ................... | B61H 5/00 188/218 XL |

FOREIGN PATENT DOCUMENTS

| | | |
|---|---|---|
| JP | 2009063072 A | 3/2009 |
| KR | 2019980049581 U | 10/1998 |
| KR | 2020000015049 U | 7/2000 |

OTHER PUBLICATIONS

English translation of the Written Opinion dated Sep. 25, 2013 for corresponding International Application No. PCT/FR2013/007061, filed Aug. 6, 2013.

\* cited by examiner

HIGHLY HEAT-RESISTANT BRAKE DISC FOR RAILCAR

CROSS-REFERENCE TO RELATED APPLICATION

This application is a Section 371 National Stage Application of International Application No. PCT/KR2013/007061, filed Aug. 6, 2013, the entire content of which is incorporated herein by reference, and published as WO 2014/081103 A1 on May 30, 2014, not in English, which claims priority from Korean Patent Application No. 10-2012-0134012 filed on Nov. 23, 2012, the entire content of which is incorporated herein by reference.

BACKGROUND

1. Field

The present invention relates to a high heat resistant brake disk for a railroad vehicle.

2. Description of the Related Art

In general, a brake disk for a railroad vehicle is installed on a side surface or an axle of a wheel of the vehicle and generates a braking force by friction with a brake pad.

To keep pace with the recent trend toward high-speed railroad vehicles, there is a pressing need for a brake disk having an excellent frictional braking force and satisfying requirements as a brake disk, including wear resistance and heat resistance.

High temperature heat of 600° C. or greater is generated at the brake disk due to friction with the brake pad and the heat repeatedly acting on the brake disk may create a thermal crack.

SUMMARY

The present invention provides a high heat resistant brake disk for a railroad vehicle, which is manufactured using a nano material having high heat conductivity, such as a carbon nanotube (CNT) or graphene, to improve heat resistance of an overheated portion of the brake disk, and which can extend a life of the brake disk by suppressing performance deterioration due to a thermal shock.

The above and other objects of the present invention will be described in or be apparent from the following description of the preferred embodiments.

According to an aspect of the present invention, there is provided a high heat resistant brake disk for a railroad vehicle, comprising a hub inserted into an axle of the railroad vehicle and an outer circumference coupled to a vehicle wheel to coaxially rotate with the vehicle wheel, wherein at least one pattern unit made from a high heat resistant nano material is formed on one surface of the brake disk.

The high heat resistant nano material may include a carbon nanotube (CNT).

The high heat resistant nano material may include graphene.

A pattern receiving groove for receiving the pattern unit may be formed on one surface of the brake disk.

The pattern receiving groove may be formed to extend from a region adjacent to the axle to a region adjacent to the vehicle wheel.

The pattern unit may include a support unit formed on an inner wall of the pattern receiving groove, and a nano structure including a plurality of rod-shaped unit structures formed on the support unit to be spaced a predetermined distance apart from each other.

The nano structure may be vertically formed toward an upper portion of the support unit.

The pattern unit may include first and second support units formed on opposing inner walls of the pattern receiving groove, and first and second nano structures including a plurality of rod-shaped unit structures formed on the first and second support units to be spaced a predetermined distance apart from each other.

The first and second nano structures may be configured such that the respective unit structures are alternately arranged.

The first and second nano structures may include the respective unit structures vertically formed toward upper portions of the first and second support units.

A heat dissipation layer made from a high heat resistant nano material may be formed on one surface of the brake disk to be positioned between pattern units adjacent to each other.

According to another aspect of the present invention, there is provided a high heat resistant brake disk for a railroad vehicle, comprising a hub inserted into an axle of the railroad vehicle and an outer circumference coupled to a vehicle wheel to coaxially rotate with the vehicle wheel, wherein a heat dissipation layer made from a high heat resistant nano material is formed on one surface of the brake disk.

The high heat resistant nano material may include a carbon nanotube (CNT).

The high heat resistant nano material may include graphene.

The heat dissipation layer may be formed to extend from a region adjacent to the axle to a region adjacent to the vehicle wheel.

As described above, in the high heat resistant brake disk for a railroad vehicle according to the present invention, the high heat resistant brake disk is manufactured using a nano material having high heat conductivity, such as a carbon nanotube (CNT) or graphene, to improve heat resistance of an overheated portion of the brake disk, and a life of the brake disk can be extended by suppressing performance deterioration due to a thermal shock.

In order to manufacture the conventional brake disk for a railroad vehicle, cast iron is generally used. The brake disk made from cast iron is liable to thermal cracks due to poor heat resistance, which may expedite wear of the brake disk, thereby shortening a life of the brake disk.

In order to manufacture the conventional brake disk for a railroad vehicle, cast iron is generally used. The brake disk made from cast iron is liable to thermal cracks due to poor heat resistance, which may expedite wear of the brake disk, thereby shortening a life of the brake disk.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION

Hereinafter, examples of embodiments of the invention will be described in detail with reference to the accompanying drawings such that they can easily be made and used by those skilled in the art.

Figure 1:
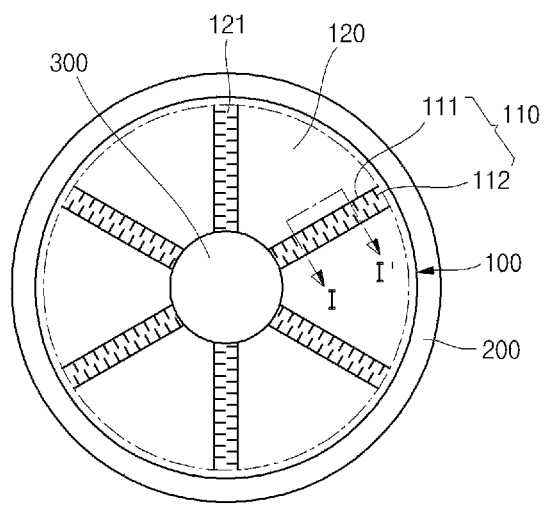
FIG. 1 is a front view of a high heat resistant brake disk for a railroad vehicle according to an embodiment of the present invention.
Figure 2:
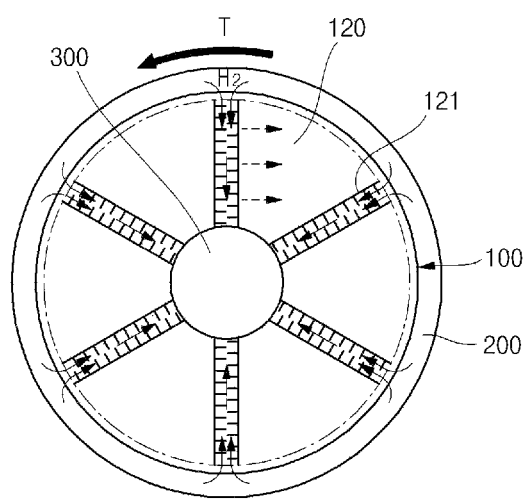
FIG. 2 is a front view illustrating a heat transfer path of the high heat resistant brake disk shown in FIG. 1.
Figure 3:
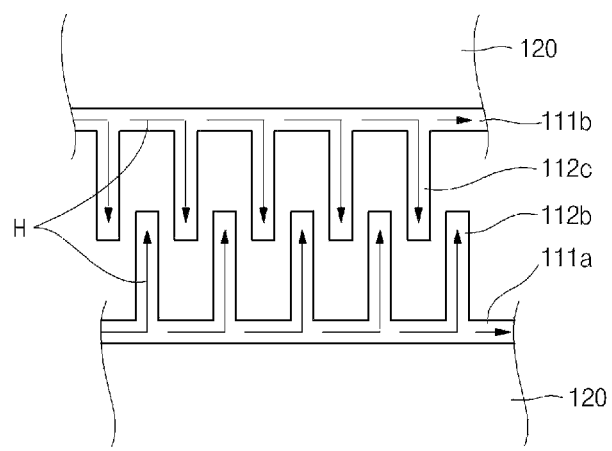
FIG. 3 is an enlarged cross-sectional view taken along the line I-I' of FIG. 1.
Figure 4:
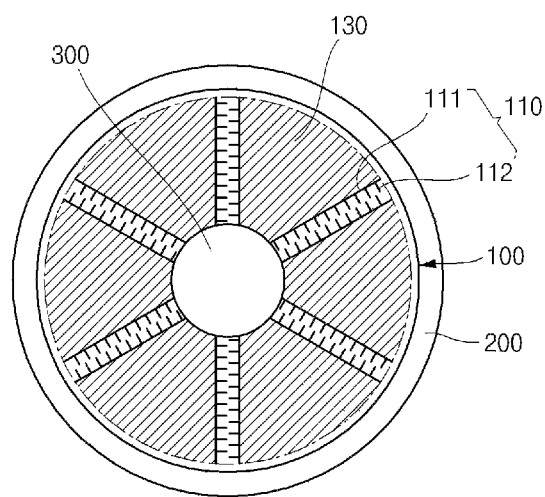
FIG. 4 is a front view of a high heat resistant brake disk for a railroad vehicle according to another embodiment of the present invention.
Figure 5:
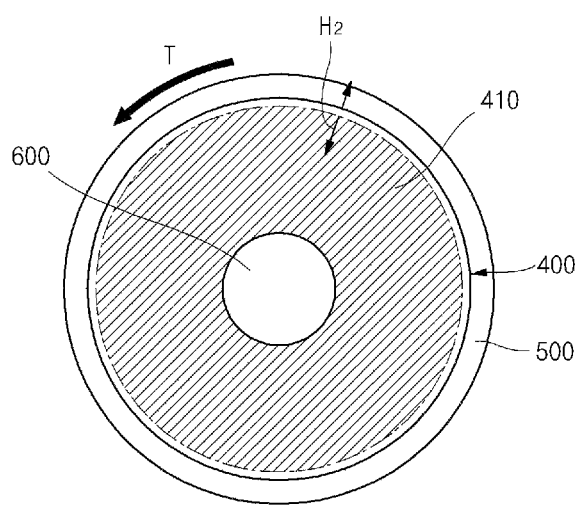
FIG. 5 is a front view of a high heat resistant brake disk for a railroad vehicle according to still another embodiment of the present invention.
Figure 6:
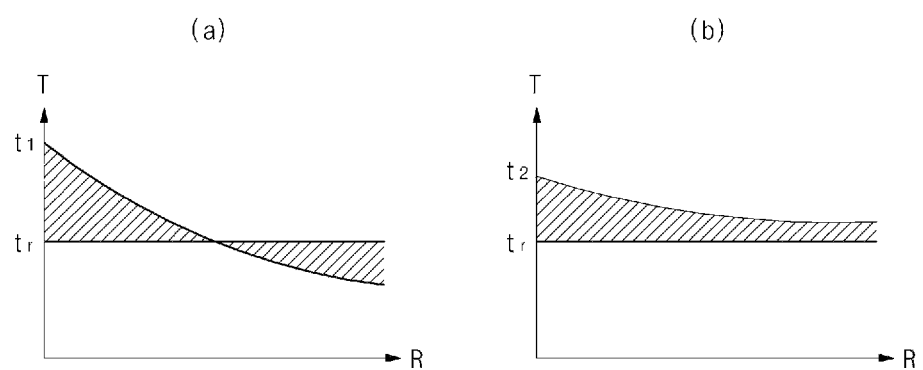
FIG. 6 is a graph illustrating temperatures decreasing by regions of a high heat resistant brake disk for a railroad vehicle according to an embodiment of the present invention.

FIG. 1 is a front view of a high heat resistant brake disk for a railroad vehicle according to an embodiment of the present invention, FIG. 2 is a front view illustrating a heat transfer path of the high heat resistant brake disk shown in FIG. 1, FIG. 3 is an enlarged cross-sectional view taken along the line I-I' of FIG. 1, FIG. 4 is a front view of a high heat resistant brake disk for a railroad vehicle according to another embodiment of the present invention, FIG. 5 is a front view of a high heat resistant brake disk for a railroad vehicle according to still another embodiment of the present invention, and FIG. 6 is a graph illustrating temperatures decreasing by regions of a high heat resistant brake disk for a railroad vehicle according to an embodiment of the present invention.

Referring to FIGS. 1 to 3, the high heat resistant brake disk 100 according to an embodiment of the present invention has a hub inserted into an axle 300 of the vehicle and an outer circumference coupled to a wheel 200 to coaxially rotate with the wheel 200.

The high heat resistant brake disk 100 includes at least one pattern unit 110 made from a high heat resistant nano material formed on its one surface (i.e., a front surface of the brake disk 100). The high heat resistant material may be a carbon nanotube (CNT) or graphene. The CNT or grapheme has high heat conductivity (for example, about 10 times heat conductivity of copper). In particular, the CNT is much lighter in weight than aluminum and has about 3 times higher rigidity and wear resistance than aluminum. In particular, the CNT is high heat conductivity. The CNT may be formed in a powder, paste or solid type. Therefore, the high heat resistant brake disk 100 includes the pattern unit 110 made from CNT and grapheme having high heat conductivity and thermal stability and formed on an over-heated portion, thereby lowering the temperature of the over-heated portion and increasing heat resistance.

In addition, a pattern receiving groove 121 for receiving the pattern unit 110 is formed on the one surface (i.e., front surface) of the high heat resistant brake disk 100. The pattern receiving groove 121 is formed to extend from a region adjacent to the axle 300 to a region adjacent to the vehicle wheel 200. That is to say, the pattern receiving groove 121 may be linearly formed on the front surface of the brake disk 100 so as to extend from the hub to the outer circumference. In addition, the pattern receiving groove 121 may have a cross section shaped to correspond to that of the pattern unit 110. Preferably, the inner wall of the pattern receiving groove 121 may be shaped of a planar rectangle, but the present invention does not limit the shape of the pattern receiving groove 121 to that disclosed herein. In addition, the pattern receiving groove 121 is preferably formed to have a depth of several millimeters, which may not affect the strength of the brake disk 100.

The pattern unit 110 may be formed on one or both of opposite inner walls of the pattern receiving groove 121. For example, the pattern unit 110 formed on both of the opposite inner walls of the pattern receiving groove 121 is illustrated in FIG. 3.

First, a case where the pattern unit 110 is formed on one of the opposite inner walls of the pattern receiving groove 121 will now be described. For the sake of convenient explanation, specific configurations of the pattern unit 110 will be described using the same reference numerals as those in a case where the pattern unit 100 is formed on both of the opposite inner walls.

The pattern unit 110 includes a support unit 111 and a nano structure 112.

The support unit 111 is planarly formed on the inner wall of the pattern receiving groove 121 in a plate shape. The support unit 111 is coupled on the planar inner wall of the pattern receiving groove 121 by, for example, welding, and supports the nano structure 112 formed thereon.

The nano structure 112 includes a plurality of rod-shaped unit structures formed on the support unit 111 so as to be spaced a predetermined distance apart from each other. The nano structure 112 is vertically formed toward an upper portion of the support unit 111. The nano structure 112 may rapidly transfer the heat ($H_1$) generated at a frictional portion and may function as a heat sink that radiating the generated heat ($H_1$) to the outside using various heat transfer paths through the respective unit structures.

Accordingly, as illustrated in FIG. 6(b), the brake disk 100 according to the present invention rapidly transfers the heat generated at the frictional area, i.e., the outer circumference, toward the hub axis through the pattern unit 110 made from a nano material having high heat conductivity, thereby decreasing a temperature gradient from the outer circumference to the axis, compared to the conventional brake disk shown in FIG. 6(a), thereby suppressing performance of the brake disk 100 from being degraded due to a thermal shock.

Next, a case where the pattern unit 110 is formed on both of the opposite inner walls of the pattern receiving groove 121 will be described.

The pattern unit 110 includes first and second support units 111a and 111b and first and second nano structures 112a and 112b.

The first and second support units 111a and 111b are planarly formed on the opposite inner walls of the pattern receiving groove 121 in plate shapes. The first and second support units 111a and 111b are coupled to the opposite inner walls of the planar pattern receiving groove 121 by, for example, welding, and support the first and second nano structures 112a and 112b formed thereon.

The first and second nano structures 112a and 112b include a plurality of rod-shaped unit structures formed on the first and second support units 111a and 111b to be spaced a predetermined distance apart from each other. The first and second nano structures 112a and 112b are configured such that the respective unit structures are alternately arranged. The first and second nano structures 112a and 112b include the respective unit structures vertically formed toward upper portions of the first and second support units 111a and 111b. The first and second nano structures 112a and 112b may rapidly transfer the heat ($H_1$) generated at the frictional portion and may function as heat sinks that radiating the generated heat ($H_1$) to the outside using various heat transfer paths through the respective unit structures.

Accordingly, as illustrated in FIG. 6(b), the brake disk 100 according to the present invention rapidly transfers the heat generated at the frictional area, i.e., the outer circumference, toward the hub axis through the pattern unit 110 made from a nano material having high heat conductivity, thereby decreasing a temperature gradient from the outer circumference to the axis, compared to the conventional brake disk shown in FIG. 6(a), thereby suppressing performance of the brake disk 100 from being degraded due to a thermal shock. In addition, according to the present invention, the heat generated at the frictional area, i.e., the outer circumference, is rapidly transferred toward the hub axis through the pattern unit 110 made from a nano material having high heat conductivity, which may lower the highest temperature ($t_2$) to be reached during use of the brake disk 100, relative to the conventional highest temperature ($t_1$), thereby suppressing performance of the brake disk 100 from being degraded due to thermal fatigue. Further, the brake disk 100 according to the present invention may have an extended life by suppressing performance degradation of the brake disk 100 in various manners, thereby ultimately reducing maintenance and repair costs.

In FIG. 6, R is a distance ranging from the outer circumference of the brake disk 100 and $t_r$ is a reference temperature before wheels are rotated.

FIG. 4 is a front view of a high heat resistant brake disk for a railroad vehicle according to another embodiment of the present invention, illustrating a modified embodiment of the high heat resistant brake disk shown in FIG. 3, including a heat dissipation layer further provided on a front surface of the brake disk. In order to avoid repeated descriptions, the same functional components as those shown in FIGS. 1 to 3 will not be described.

That is to say, referring to FIG. 4, a heat dissipation layer 130 made from a high heat resistant nano material is formed on the front surface of the high heat resistant brake disk 100 to be positioned between pattern units adjacent to each other. Here, the high heat resistant nano material may include a carbon nanotube (CNT) or graphene. Therefore, according to the embodiment of the present invention, the heat ($H_2$) generated at the frictional area, i.e., the outer circumference, is rapidly transferred toward the hub axis and outwardly through the heat dissipation layer 130 formed between the adjacent pattern units 110 made from nano materials having high heat conductivity, so that the highest temperature ($t_2$) to be reached during use of the brake disk 100 may be relative lowered, thereby suppressing performance of the brake disk 100 from being degraded due to thermal shocks.

FIG. 5 is a front view of a high heat resistant brake disk for a railroad vehicle according to still another embodiment of the present invention, illustrating a modified embodiment of the high heat resistant brake disk shown in FIGS. 1 to 3, including a heat dissipation layer, instead of a pattern unit, provided on a front surface of the brake disk. In order to avoid repeated descriptions, the same functional components as those shown in FIGS. 1 to 3 will not be described.

Referring to FIG. 5, the high heat resistant brake disk 400 for a railroad vehicle according to still another embodiment of the present invention may include a hub inserted into an axle 600 of the railroad vehicle and an outer circumference coupled to a vehicle wheel 500 to coaxially rotate with the vehicle wheel 500. Here, a heat dissipation layer 410 made from a high heat resistant nano material is formed on one surface of the brake disk 400. The heat dissipation layer 410 is formed to extend from a region adjacent to the axle 600 to a region adjacent to the vehicle wheel 500. In addition, the high heat resistant nano material may include a carbon nanotube (CNT) or graphene.

Therefore, in order to solve a crucial problem of overheating of the brake disk, which is one of essential components of transportation means, such as a railroad vehicle, the high heat resistant brake disk 400 for a railroad vehicle according to still another embodiment of the present invention may provide a simplified manufacturing method of the brake disk demonstrating excellent performance in lowering the temperature.

While the brake disk for a railroad vehicle according to the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A high heat resistant brake disk for a railroad vehicle, comprising:
   a hub inserted into an axle of the railroad vehicle;
   an outer circumference of the disk being coupled to a wheel of the railroad vehicle to coaxially rotate with the wheel,
   a pattern receiving groove extending from a region adjacent the axle to a region adjacent the outer circumference of the disk and integrally formed linearly within a surface of the brake disk; and
   at least one pattern unit made from a high heat resistant nano material,
   wherein the at least one pattern unit is provided within the pattern receiving groove such that the at least one pattern unit is formed in contact with at least one inner wall of the at least one pattern receiving groove and thus within the at least one pattern receiving groove and thus forming a surface of the brake disk, and
   wherein heat generated from braking is transferred away from a friction point at the outer circumference of the disk through at least one pattern unit to the hub such that the disk provides a decreasing temperature gradient from the outer circumference to the axle.

2. The high heat resistant brake disk of claim 1, wherein the high heat resistant nano material includes a carbon nanotube (CNT).

3. The high heat resistant brake disk of claim 1, wherein the high heat resistant nano material includes graphene.

4. The high heat resistant brake disk of claim 1, wherein the pattern receiving groove is formed to extend from the hub to the outer circumference of the brake disk.

5. The high heat resistant brake disk of claim 1, wherein the pattern unit includes a support unit formed on an inner wall of the pattern receiving groove, and a nano structure including a plurality of rod-shaped unit structures formed on the support unit to be spaced a predetermined distance apart from each other.

6. The high heat resistant brake disk of claim 5, wherein the nano structure is vertically formed toward an upper portion of the support unit.

7. The high heat resistant brake disk of claim 1, wherein the pattern unit includes first and second support units formed on opposing inner walls of the pattern receiving groove, and first and second nano structures including a plurality of rod-shaped unit structures formed on the first and second support units to be spaced a predetermined distance apart from each other.

8. The high heat resistant brake disk of claim 7, wherein the first and second nano structures are configured such that the respective unit structures are alternately arranged.

9. The high heat resistant brake disk of claim 7, wherein the first and second nano structures include the respective unit structures vertically formed toward upper portions of the first and second support units.

10. The high heat resistant brake disk of claim 1, wherein a heat dissipation layer made from a high heat resistant nano material is formed on one surface of the brake disk to be positioned between pattern units adjacent to each other.

11. A high heat resistant brake disk for a railroad vehicle, comprising a hub inserted into an axle of the railroad vehicle and an outer circumference coupled to a vehicle wheel to coaxially rotate with the vehicle wheel, wherein a heat dissipation layer made from a high heat resistant nano material is formed within a pattern receiving groove linearly extending from a region adjacent the axle to a region adjacent the vehicle wheel such that the groove is integrally formed on the brake disk and the heat dissipation layer is in contact with at least one inner wall of the pattern receiving groove such that the heat dissipation layer and the groove are part of the surface of the brake disk such that heat generated from braking is transferred away from a friction point at the outer circumference of the disk along at least one pattern receiving groove to the hub such that the disk has a decreasing temperature gradient from the outer circumference to the axle.

12. The high heat resistant brake disk of claim 11, wherein the high heat resistant nano material includes a carbon nanotube (CNT).

13. The high heat resistant brake disk of claim 11, wherein the high heat resistant nano material includes graphene.

14. The high heat resistant brake disk of claim 11, wherein the heat dissipation layer is formed to transfer heat generated at a frictional area along the outer circumference of the disk toward the hub through the heat dissipation layer.

* * * * *